(12) United States Patent
Wai et al.

(10) Patent No.: US 9,099,954 B2
(45) Date of Patent: Aug. 4, 2015

(54) ENFORCED ZERO VOLTAGE LOOP

(71) Applicant: Caterpillar, Inc., Peoria, IL (US)

(72) Inventors: Jackson Wai, Dunlap, IL (US); Ahmed Khalil, Peoria, IL (US); Carlos Nino Baron, Peoria, IL (US); Jesse Gerdes, Dunlap, IL (US); Brad A Kough, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 97 days.

(21) Appl. No.: 13/951,068

(22) Filed: Jul. 25, 2013

(65) Prior Publication Data

US 2015/0028788 A1    Jan. 29, 2015

(51) Int. Cl.
*H02P 1/00* (2006.01)
*H02P 3/00* (2006.01)
*H02P 27/06* (2006.01)

(52) U.S. Cl.
CPC ..................................... *H02P 27/06* (2013.01)

(58) Field of Classification Search
CPC ........ B26B 19/00; B26B 19/06; B26B 19/38; B26B 19/388
USPC ............ 318/254, 504, 565, 800, 811; 361/23, 361/42; 363/43
See application file for complete search history.

(56) References Cited

U.S. PATENT DOCUMENTS

| 4,870,557 | A | * | 9/1989 | Stacey | ............................. 363/43 |
| 5,689,164 | A | | 11/1997 | Hoft et al. | |
| 6,661,206 | B2 | | 12/2003 | Gallegos-Lopez | |
| 7,518,335 | B2 | * | 4/2009 | West et al. | ..................... 318/811 |
| 7,723,946 | B2 | * | 5/2010 | Welchko et al. | .............. 318/811 |
| 8,023,234 | B2 | * | 9/2011 | Andersen | ........................ 361/42 |
| 8,044,631 | B2 | * | 10/2011 | Dai et al. | ....................... 318/800 |
| 8,379,353 | B2 | * | 2/2013 | Andersen | ........................ 361/42 |
| 2002/0175644 | A1 | * | 11/2002 | Su | .................................. 318/254 |
| 2004/0154411 | A1 | | 8/2004 | Viti | |
| 2006/0250728 | A1 | | 11/2006 | Hussein | |
| 2008/0094023 | A1 | * | 4/2008 | West et al. | ..................... 318/811 |
| 2008/0129238 | A1 | * | 6/2008 | Andersen | ...................... 318/565 |
| 2008/0258673 | A1 | * | 10/2008 | Welchko et al. | .............. 318/811 |
| 2010/0165674 | A1 | * | 7/2010 | Dai et al. | ......................... 363/37 |
| 2011/0249368 | A1 | * | 10/2011 | Andersen | ........................ 361/23 |
| 2013/0147416 | A1 | | 6/2013 | Khalil et al. | |

FOREIGN PATENT DOCUMENTS

| JP | 08251976 | 8/1996 |
| JP | 2011151997 | 8/2011 |
| KR | 1020060108021 | 10/2006 |

* cited by examiner

*Primary Examiner* — Paul Ip
(74) *Attorney, Agent, or Firm* — Miller, Matthias & Hull LLP

(57) ABSTRACT

A method of controlling a motor is provided. The method may determine one of a switching period, a fundamental cycle, and a current target per phase leg of the motor having at least one high voltage transition point; determine a dwell period to be enforced at the transition point between an engagement of a first switch of the phase leg and an engagement of a second switch of the phase leg where each of the first switch and the second switch may be selectively engageable between a first state and a second state; engage the first switch from the first state to the second state at the transition point; and engage the second switch from the first state to the second state after the transition point and upon expiration of the dwell period.

20 Claims, 6 Drawing Sheets

ENFORCED ZERO VOLTAGE LOOP

TECHNICAL FIELD

The present disclosure relates generally to electric drive systems, and more particularly, to systems and methods of controlling high voltage transitions during operation of an electric motor.

BACKGROUND

With the growing interest in energy conservation, increasingly more industrial work machines are supplied with electric drive assemblies or systems for driving the work machine and operating its various tools or functions. Ongoing developments in electric drive systems have made it possible for electrically driven work machines to effectively match or surpass the performance of predominantly mechanically driven work machines while requiring significantly less fuel and overall energy. As electric drive systems become increasingly more commonplace with respect to industrial work machines, and the like, the demands for more efficient motors, generators and techniques for controlling same have also increased.

An electric motor of an electric drive machine is typically used to convert mechanical power received from a primary power source, such as a combustion engine, into electrical power for performing one or more operations of the work machine. Additionally, an electric motor may be used to convert electrical power stored within a common bus or storage device into mechanical power. Among the various types of electric motors available for use with an electric drive system, switched reluctance machines have received great interest for being robust, cost-effective, and overall, more efficient. While currently existing systems and methods for controlling switched reluctance machines may provide adequate control, there is still much room for improvement.

Control schemes for switched reluctance machines may typically involve operating two switches of each phase leg of the machine to pulse or chop the electrical current thereby effectively providing a waveform, such as a pulse width modulated PWM waveform. Toward the end of a given switching period or fundamental cycle, upon reaching a current target threshold, or when there is an otherwise corresponding decrease in current demand, both switches of a particular phase leg of the machine in conventional control systems may be disabled. Conversely, at the beginning of a given switching period or fundamental cycle, upon reaching a current target threshold, or when there is an otherwise corresponding increase in current demand, both switches of a particular phase leg of the machine in conventional control systems may be enabled. Disabling or enabling both switches of a phase leg can expose the phase windings to abrupt and high magnitude voltage swings which can further cause excessive wear to the winding insulation of the associated switched reluctance machine and other undesirable effects.

The present disclosure is directed at addressing one or more of the deficiencies set forth above.

SUMMARY OF THE DISCLOSURE

In one aspect of the present disclosure, a method of controlling a motor is provided. The method may determine one of a switching period, a fundamental cycle, and a current target threshold per phase leg of the motor having at least one high voltage transition point; determine a dwell period to be enforced at the transition point between an engagement of a first switch of the phase leg and an engagement of a second switch of the phase leg where each of the first switch and the second switch may be selectively engageable between a first state and a second state; engage the first switch from the first state to the second state at the transition point; and engage the second switch from the first state to the second state after the transition point and upon expiration of the dwell period.

In another aspect of the present disclosure, a control system for a motor is provided. The control system may include a converter circuit and a controller. The converter circuit may be operatively coupled to a stator of the motor including at least a first switch and a second switch coupled to each phase leg of the stator where each of the first switch and the second switch may be selectively engageable between a first state and a second state. The controller may be in communication with at least the motor and each of the first switch and the second switch of each phase leg. The controller may be configured to determine a dwell period to be enforced at a high voltage transition point between an engagement of the first switch and an engagement of the second switch, engage the first switch from the first state to the second state at the transition point, and engage the second switch from the first state to the second state after the transition point and upon expiration of the dwell period.

In yet another aspect of the present disclosure, an electric drive system is provided. The electric drive system may include an electric motor, a converter circuit and a controller. The electric motor may include a rotor and a stator where each of the rotor and the stator may include a plurality of phase legs. The converter circuit may be in communication with the motor and include at least a first switch and a second switch coupled to each phase leg where each of the first switch and the second switch may be selectively engageable between a first state and a second state. The controller may be in communication with at least the motor and each of the first switch and the second switch of the converter circuit. The controller may be configured to determine a dwell period to be enforced at a high voltage transition point between an engagement of the first switch and an engagement of the second switch, engage the first switch from the first state to the second state at the transition point, and engage the second switch from the first state to the second state after the transition point and upon expiration of the dwell period.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
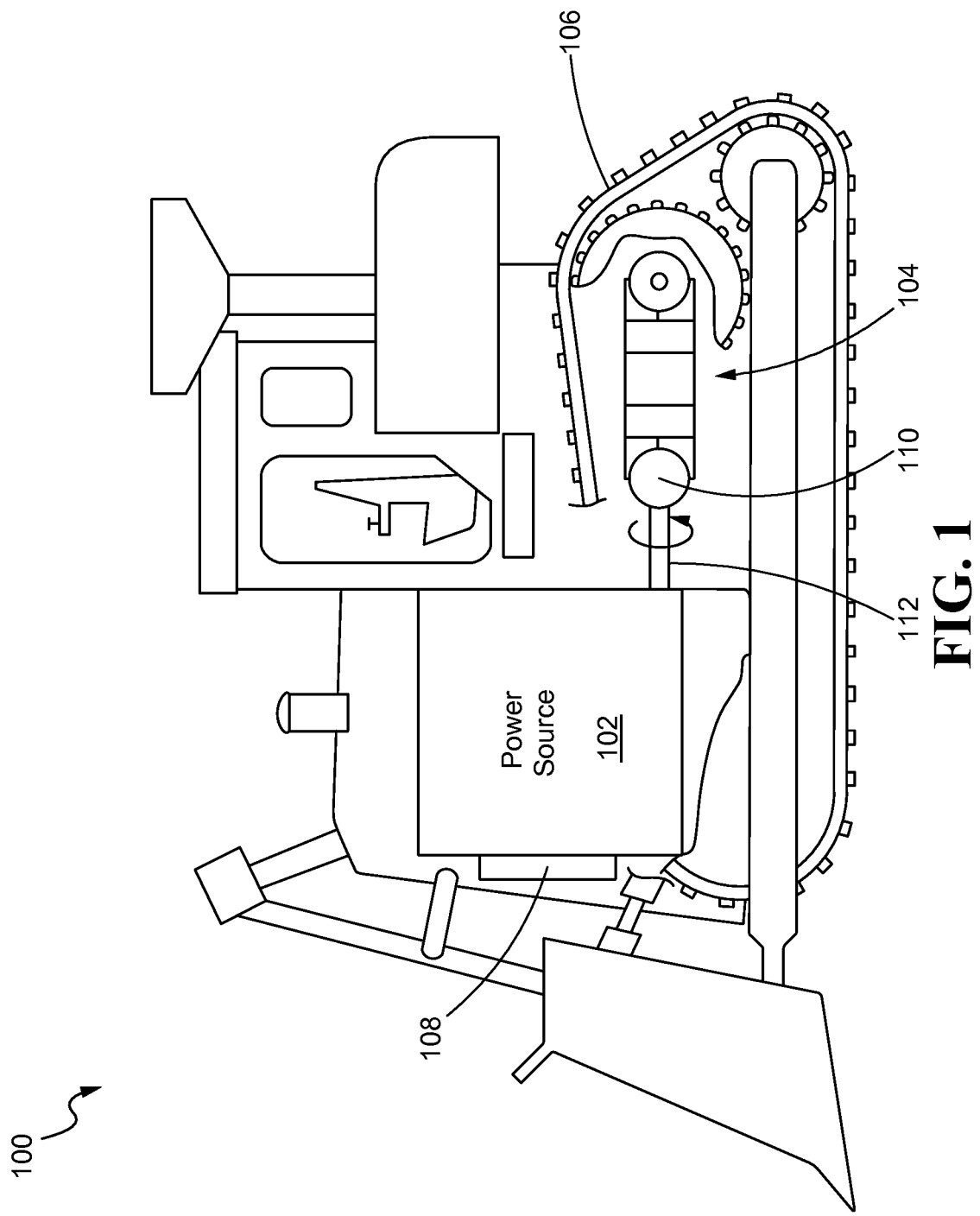
FIG. 1 is a diagrammatic view of one exemplary machine with an electric drive system.

FIG. 1 diagrammatically illustrates a machine 100 that may employ electric drive means for causing movement and/or for performing work. More specifically, the machine 100 may include a power source 102 which may be coupled to an electric drive system 104 for causing movement via a traction device 106 or perform other functions. Such a machine 100 may be used as a work machine for performing a particular type of operation associated with an industry, such as mining, construction, farming, transportation, or any other suitable industry known in the art. For example, the machine 100 may be an earth moving machine, a marine vessel, an aircraft, a tractor, an off-road truck, an on-highway passenger vehicle, or any other mobile machine. In other alternatives, the machine 100 may be used in conjunction with stationary applications and implemented with, for instance, windmills, hydro-electric dams, batteries, fuel cells, or any other suitable source of energy. The power source 102 of the electric drive system 104 may include, for example, a diesel engine, a gasoline engine, a natural gas engine, or any other type of combustion engine commonly used for generating power. The engine 102 may be configured to mechanically transmit power to a generator or an electric motor 110 of the electric drive system 104 via a coupling or axially rotating drive shaft 112.

Figure 2:
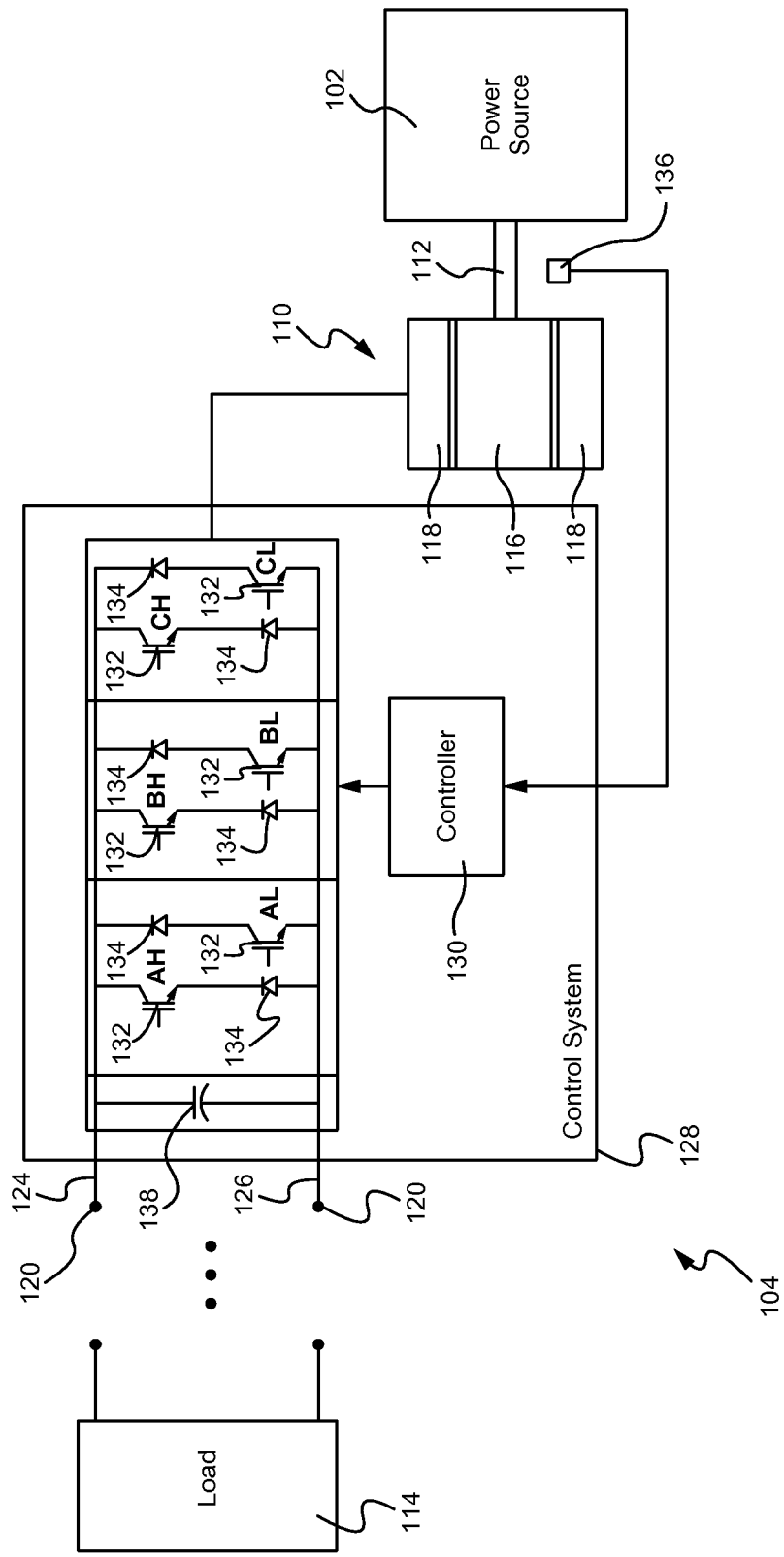
FIG. 2 is a schematic view of one exemplary control system for an electric drive constructed in accordance with the teachings of the present disclosure.

FIG. 2 schematically illustrates one exemplary electric drive system 104 that may be employed to communicate power between the engine 102 and one or more electrical loads 114. The motor 110 of the electric drive system 104 in FIG. 2 may be a switched reluctance machine, or the like, configured to produce electrical power in response to rotational input from the engine 102 and communicate the electrical power to one or more electrical loads 114 of the machine 100. The load 114 may include, for example, motors for causing motion of the machine 100 as well as motors for operating various mechanical tools of the machine 100. As is well known in the art, the motor 110 may include a rotor 116 that is rotatably disposed within a fixed stator 118. The rotor 116 may be coupled to an output of the engine 102 via the drive shaft 112, or in other related embodiments, via a direct crankshaft, a gear train, a hydraulic circuit, and the like. The stator 118 may be electrically coupled to a common bus 120 of the electric drive system 104 via a converter circuit 122.

During a generating mode of operation, as the rotor 116 is rotated within the stator 118 by the engine 102, electrical current may be induced within the stator 118 and supplied to the converter circuit 122. The converter circuit 122 may in turn convert the electrical signals into an appropriate direct current DC voltage for distribution to the various electrical loads 114 of the machine 100. Additionally, the motor 110 may be enabled to cause rotation of the rotor 116 in response to electrical signals that are provided to the stator 118 from the common bus 120, for instance, during a motoring mode of operation. The common bus 120 may include a positive line 124 and a negative or ground line 126 across which a common DC bus voltage may be communicated to one or more loads 114 of the machine 100 coupled thereto. The converter circuit 122 may provide a DC voltage signal to be communicated through the common bus 120 and to a rectifier circuit where the DC voltage may be converted into the appropriate alternating current AC signals for driving, for example, one or more traction motors, or the like, for causing motion of the machine 100 via the traction device 106. The common bus 120 may also communicate the common DC voltage to other loads 114 of the machine 100, such as a hybrid system, electrically driven pumps, electrically driven fans, and the like.

Still referring to FIG. 2, the electric drive system 104 may also include a control system 128 for controlling the motor 110. The control system 128 may essentially include a controller 130 that is in communication with at least the converter circuit 122 associated with the electric drive system 104. The converter circuit 122 may include a series of transistors or gated switches 132, such as insulated-gate bipolar transistors, and diodes 134 for selectively enabling one or more phase windings of the motor 110. A three-phase switched reluctance motor 110 may be driven using a converter circuit 122 having six switches 132 and six diodes 134, or for example, two switches 132 and two diodes 134 for selectively enabling or disabling each of the three phase legs of the motor 110. Each of the switches 132 may be enabled or disabled via gate signals, which may be supplied by the controller 130. In particular modifications, the control system 128 may also be provided with encoders, sensors 136, or the like, adapted to generate sensor signals corresponding to the rotational position and/or frequency of the rotor 116 relative to the stator 118, or other relevant information, and communicate such sensor signals to an input of the controller 130. The sensors 136 may include a Hall-effect sensor, a variable reluctance sensor, an anisotropic magnetoresistance sensor, or the like. Power to the control system 128 and the converter circuit 122 may be provided by an external or secondary power source, such as provided by a battery not shown, residual voltage stored in a capacitor 138 of the common bus 120, or any other suitable current limited DC power supply.

The controller 130 of FIG. 2 may be implemented using one or more of a processor, a microprocessor, a microcontroller, an electronic control module ECM, an electronic control unit ECU, or any other suitable means for providing electronic control to the electric drive system 104. Among other things, the controller 130 may be configured to operate the electric drive system 104 according to a predetermined algorithm or set of instructions designed to actively prevent or at least reduce wear on the winding insulation per phase leg of the motor 110, for instance, at the end of a switching period or fundamental cycle, upon reaching a current target threshold, or when the current demand for a particular phase leg increases or decreases. More particularly, the controller 130 may be configured to enforce a zero voltage loop by implementing a dwell period during its engagement of the switches 132 per phase leg. Such algorithms may reference predefined and fixed dwell period values, and/or dwell period values that are variable according to preprogrammed control maps, lookup tables, or the like, which may suggest to the controller 130 the optimum control scheme for the given operating conditions and parameters of the motor 110 and the machine 100. Such algorithms or sets of instructions and conditionals may be preprogrammed or incorporated into a memory that is accessible by the controller 130 by means commonly known in the art.

In addition, the respective raw commands or command signals for driving the switches 132 may vary according to the specific switch 132 that is being controlled. For instance, the raw command signals which normally drive the upper switch 132 of a phase leg may be distinct from the raw command signals which normally drive the lower switch 132 of that phase leg. The controller 130 may thus be configured with an algorithm for enforcing a zero voltage loop that is adapted to take such distinctions into account during operation and appropriately adapt the zero voltage loop dwell period as necessary. For example, once a zero voltage loops is triggered, the amount of time needed to enforce the zero voltage loop may be diminished, eliminated or otherwise modified based on any known distinctions between the raw command signals for the different switches 132 in a given phase leg.

Figure 3:
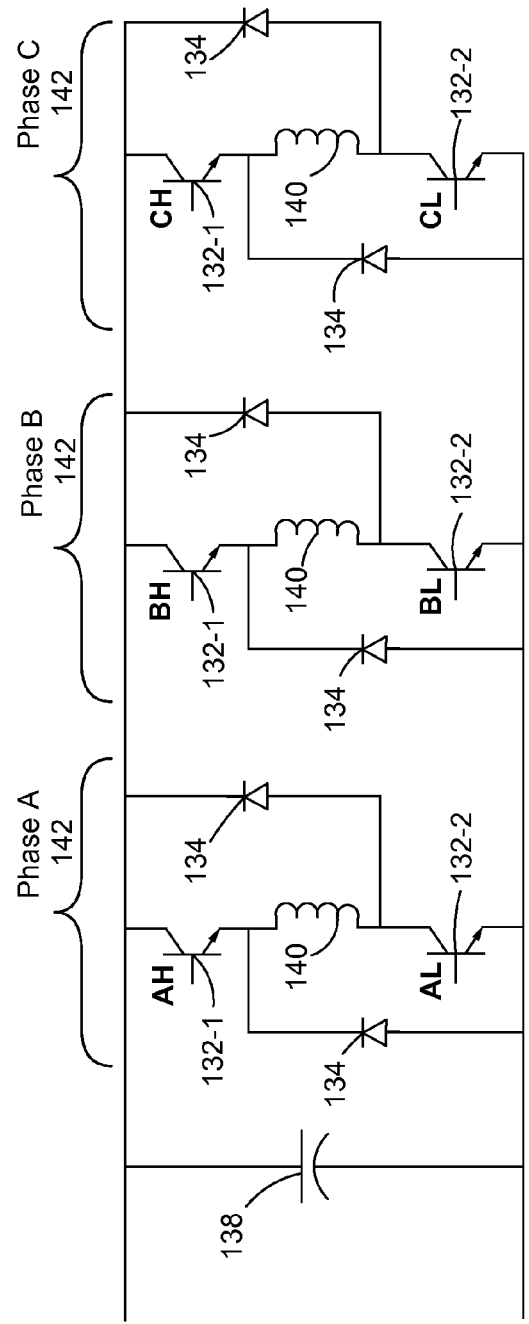
FIG. 3 is a schematic view of one exemplary power converter circuit for a switched reluctance motor.

Turning now to FIG. 3, for example, the converter circuit 122 may be configured such that the inductor 140 corresponding to the winding insulation in each phase leg 142 of the motor 110 is essentially disposed between the corresponding first switch 132-1 and the corresponding second switch 132-2. Moreover, the converter circuit 122 may be configured and operated in a manner in which each of the switches 132 in each phase leg 142 is selectively operated between a first state and a second state based on the current demand of the motor 110 and the electric drive system 104, and according to respective raw command signals as provided by the controller 130. While other arrangements are possible, in one configuration, the first state may correspond to an electrically closed or switched ON state where current is allowed to flow through the switch 132, while the second state may correspond to an electrically open or switched OFF state where current is prevented from flowing through the switch 132. Additionally, when the switching period or fundamental cycle for a given phase leg 142 ends, upon reaching a current target threshold, or when there is an otherwise sufficient decrease in current demand, both switches 132 of the phase leg 142 may be engaged into the second or switched OFF state. Correspondingly, when the switching period or fundamental cycle for a given phase leg 142 begins, upon reaching a current target threshold, or when there is an otherwise sufficient increase in current demand, both switches 132 of the phase leg 142 may be engaged into the first or switched ON state.

As illustrated in FIGS. 4-7, conventional schemes may engage both switches 132 at substantially the same time and at the end or beginning of a given switching period or fundamental cycle, upon reaching a current target threshold, or upon a change in the current demand or any other high voltage transition point 144, and thereby potentially expose the associated winding insulation 140 of the motor 110 to significant voltage swings. For example, conventional switching schemes may expose motor windings 140 to voltage differentials of approximately twice the magnitude of the supply voltage in the common bus 120. To reduce such exposures and to help prevent excess wear on the winding insulation 140 during such high voltage transition points 144, the converter circuit 122 of the present disclosure may be operated in a manner which implements a dwell period 146 between the respective engagements of the switches 132 as shown in FIGS. 4-7. More particularly, while still further configurations may exist, the dwell period 146 or zero voltage loop may be enforced upon an upper switch 132-1 of a given phase leg 142, upon a lower switch 132-2 of a given phase leg 142, at the end of a switching period, at the beginning of a switching period, or any other combination thereof, as further illustrated in FIGS. 4-7.

Figure 4:
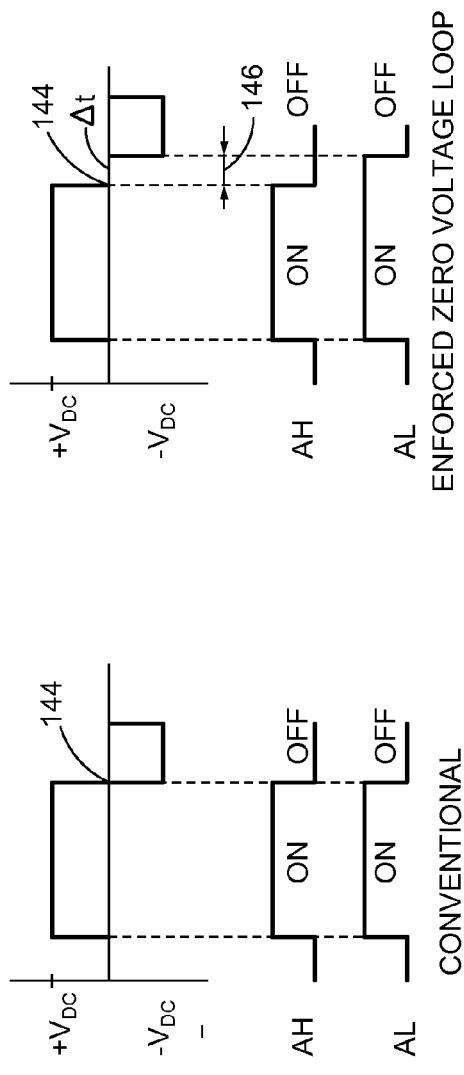
FIG. 4 is a graphical view of a conventional current chopping waveform as compared with one exemplary chopping waveform, where both switches of one phase leg are turned off with a dwell period being enforced on the lower switch.
Figure 5:
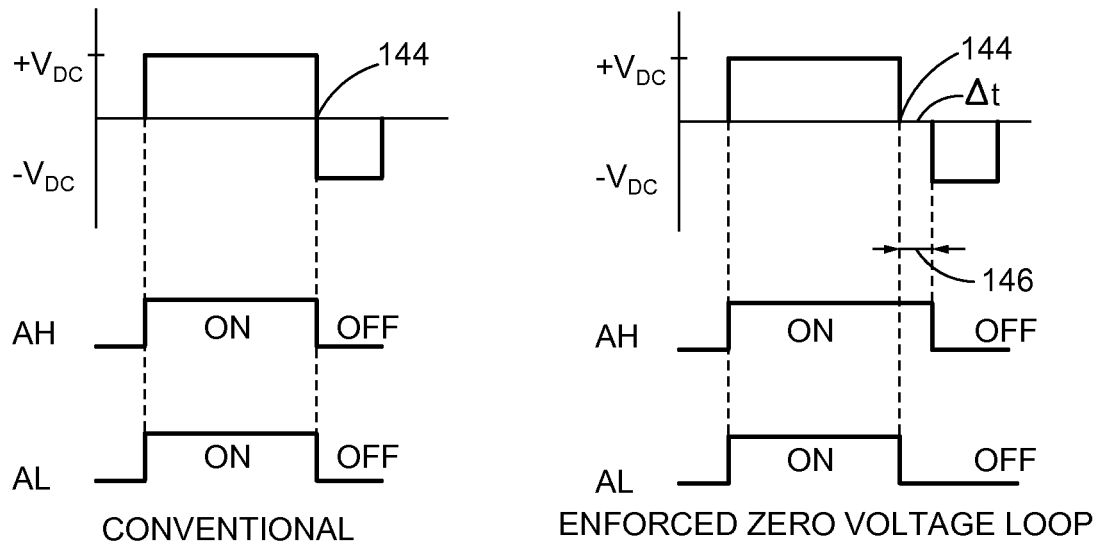
FIG. 5 is a graphical view of a conventional current chopping waveform as compared with one exemplary chopping waveform, where both switches of one phase leg are turned off with a dwell period being enforced on the upper switch.

As shown in FIGS. 4 and 5, the zero voltage loop may be enforced at the end of a switching period, or when an anticipated high voltage transition point 144 requires both of the switches 132 of a given phase leg 142 to be disabled or switched from ON to OFF. In FIG. 4 for example, the engagement of the lower switch 132-2 of a given phase leg 142 may be delayed in relation to the engagement of the corresponding upper switch 132-1 by a preconfigured fixed or variable duration $\Delta t$ at the end of the switching period or high voltage transition point 144. Similarly, as shown in FIG. 5 for example, the engagement of the upper switch 132-1 of a given phase leg 142 may be delayed in relation to the engagement of the corresponding lower switch 132-2 by a preconfigured fixed or variable duration $\Delta t$ at the end of the switching period or high voltage transition point 144. Moreover, in FIGS. 4 and 5, the zero voltage loop may be enforced by integrating a dwell period 146 into the raw command signal for only one of the two switches 132 such that the raw command signal for the remaining one of the switches 132 is left unchanged and disables the switch approximately at the high voltage transition point 144. However, in other modifications, the zero voltage loop may be coordinated using the raw command signals for both switches 132 so as to incorporate a dwell period 146 which at least partially coincides with the anticipated high voltage transition point 144.

Figure 6:
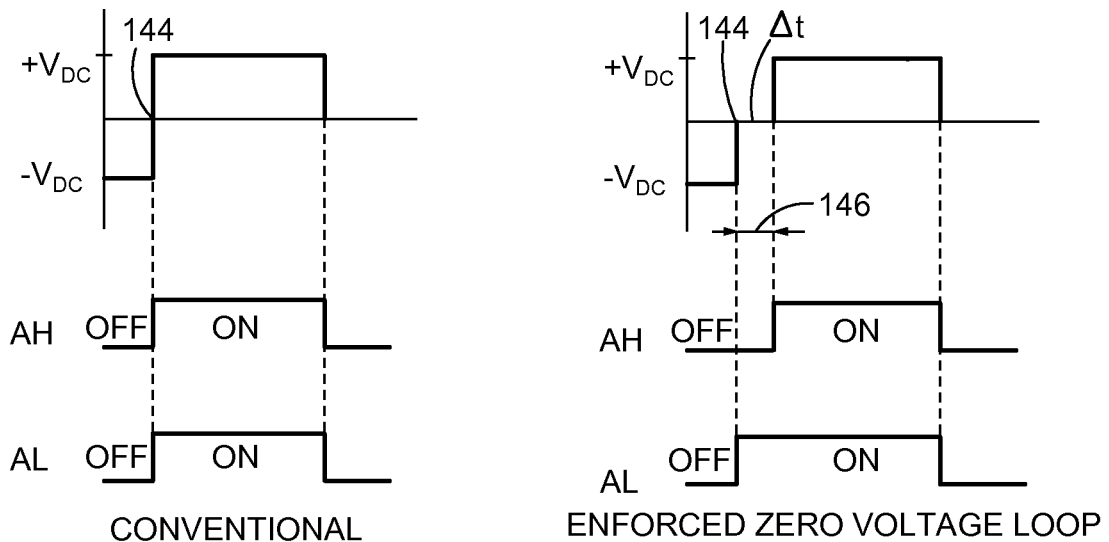
FIG. 6 is a graphical view of a conventional current chopping waveform as compared with one exemplary chopping waveform, where both switches of one phase leg are turned on with a dwell period being enforced on the upper switch.
Figure 7:
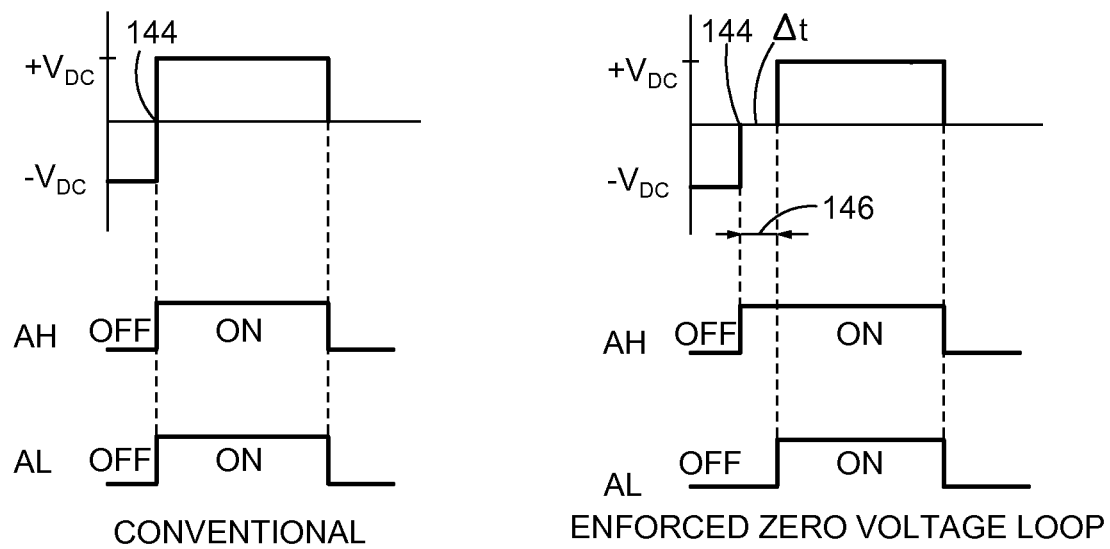
FIG. 7 is a graphical view of a conventional current chopping waveform as compared with one exemplary chopping waveform, where both switches of one phase leg are turned on with a dwell period being enforced on the lower switch.

Furthermore, as shown in FIGS. 6 and 7, the zero voltage loop may be enforced at the beginning of a switching period, or when an anticipated high voltage transition point 144 requires both of the switches 132 of a given phase leg 142 to be enabled or switched from OFF to ON. In FIG. 6 for example, the engagement of the upper switch 132-1 of a given phase leg 142 may be delayed in relation to the engagement of the corresponding lower switch 132-2 by a preconfigured fixed or variable duration $\Delta t$ at the beginning of the switching period or high voltage transition point 144. Similarly, as shown in FIG. 7, the engagement of the lower switch 132-2 of a given phase leg 142 may be delayed in relation to the engagement of the corresponding upper switch 132-1 by a preconfigured fixed or variable duration $\Delta t$ at the beginning of the switching period or high voltage transition point 144. As in previous embodiments, the zero voltage loop in FIGS. 6 and 7 may be enforced by integrating a dwell period 146 into the raw command signal for only one of the two switches 132 such that the raw command signal for the remaining one of the switches 132 is left unchanged and enables the remaining switch 132 approximately at the high voltage transition point 144. However, in other modifications, the zero voltage loop may be coordinated using the raw command signals for both switches 132 so as to incorporate a dwell period 146 which at least partially coincides with the anticipated high voltage transition point 144.

By enforcing a zero voltage loop as shown in each of the embodiments of FIGS. 4-7, the electric drive system 104 may be able to actively decrease the voltage swing and corresponding rate of current flow to which the winding insulation 140 is exposed and reduce the overall wear thereon. For example, the switches 132 may be engaged such that the winding insulation 140 may be first subjected only to a voltage drop of $V_{DC}$, temporarily held at 0 $V_{DC}$ for a duration of $\Delta t$, and then subsequently subjected to the remaining $V_{DC}$, rather than being instantaneously exposed to the entire $2V_{DC}$ at once. While other dwell periods may be possible, the duration $\Delta t$ of the dwell period 146 in FIG. 4 may be defined to be approximately between 2 μs and 4 μs.

Figure 8:
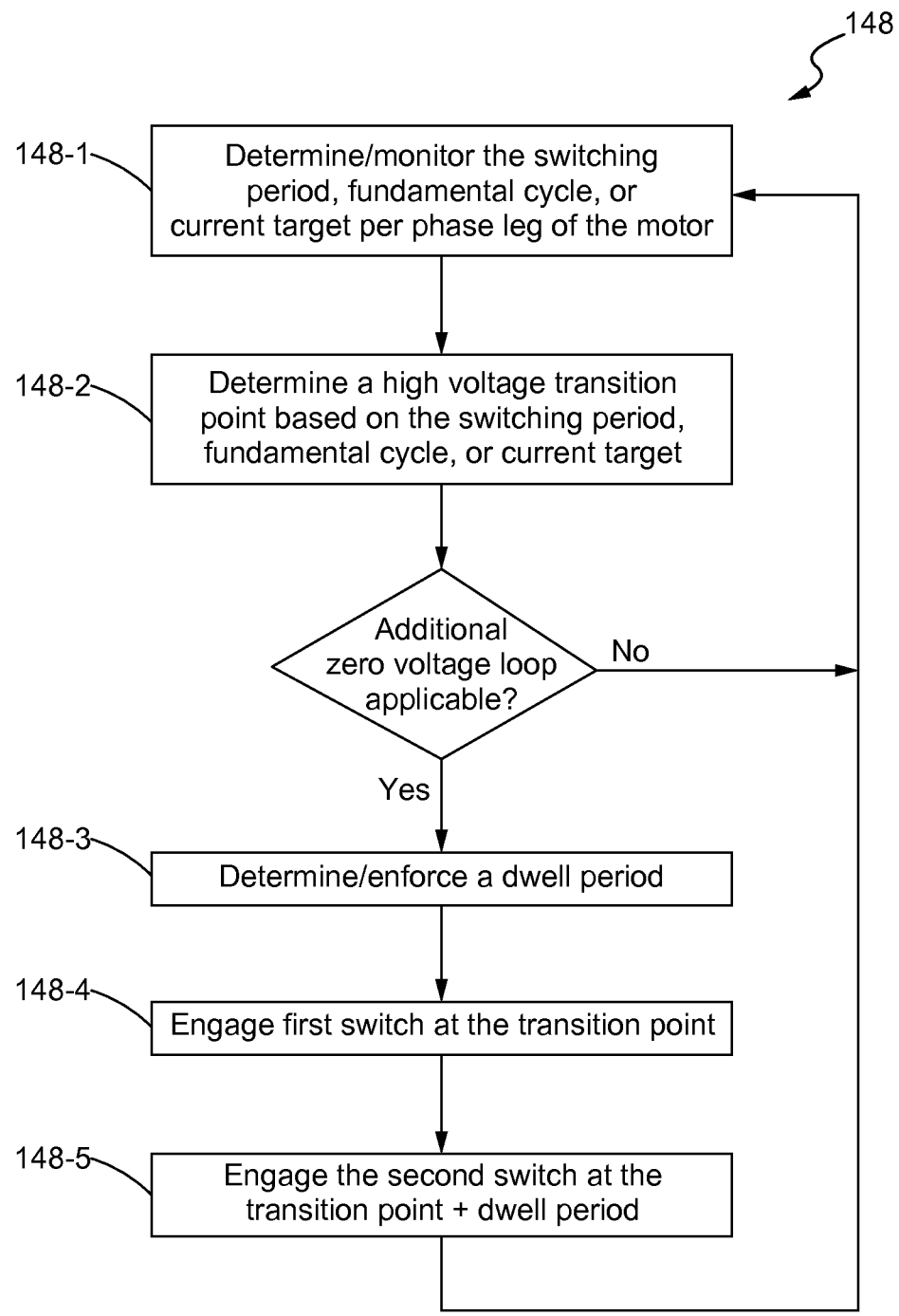
FIG. 8 is a flow diagram of one exemplary algorithm or method of enforcing a zero voltage loop.

Referring now to FIG. 8, a flow diagram of an exemplary algorithm or method 148 by which the controller 130 may be configured to operate the electric drive system 104 is provided. As shown, the controller 130 may initially be configured to determine and/or monitor the fundamental cycle, or as it may be necessary in some situations or operating modes, the switching period per phase leg 142 of the motor 110 in step 148-1. The controller 130 may also be configured to monitor a current target as compared with a predefined current target threshold, or the like. Based on the switching period, fundamental cycle, or current target threshold, the controller 130 may be configured to determine when a high voltage transition point 144 is expected or anticipated in step 148-2. As shown for example in FIGS. 4 and 5, the controller 130 may be configured to find a high voltage transition point 144 at approximately the end of a switching period, or when there is a substantial decrease in the current demand and the bus voltage transitions from a positive DC voltage to a negative DC voltage. The controller 130 may also be configured to find a high voltage transition point 144 at approximately the beginning of a switching period, or when there is a substantial increase in the current demand and the bus voltage transitions from a negative DC voltage to a positive DC voltage, as shown for example in FIGS. 6 and 7.

If the switching period does not indicate such a high voltage transition point 144, the controller 130 may remain in steps 148-1 and 148-2 and continue normal operation of the switches 132, via corresponding raw command signals, in the given phase leg 142. In other configurations, the controller 130 may be configured to bypass the zero voltage loop and continue normal operation even if the switching period indicates a high voltage transition point 144. For example, if the switching period indicates a high voltage transition point 144, but if a zero voltage loop is already in effect from a prior iteration, the controller 130 may be configured to return to steps 148-1 and 148-2. In still further modifications, the controller 130 may not only be adapted to assess whether a zero voltage loop should be enforced, but also adapted to assess whether an existing, or a zero voltage loop that is already in effect, should be extended. If any one or more of the switching period, fundamental cycle and current target indicate a high voltage transition point 144 during step 148-2 and there is no zero voltage loop already in effect, or if an existing zero voltage loop should be extended, the controller 130 may be configured to proceed to step 148-3 and determine or enforce a predefined dwell period 146. As illustrated in FIGS. 4-7, for example, the controller 130 may be configured to enforce a zero voltage loop, or generally hold the voltage drop across the winding insulation 140 of the given phase leg 142 for a dwell period 146 of duration Δt, which may further be defined as having a duration Δt of approximately between 2 μs and 4 μs.

In accordance with step 148-4 of the method 148 of FIG. 8, the controller 130 may enforce the zero voltage loop by engaging one of the two switches 132 of the phase leg 142 from a first state to a second state approximately at the high voltage transition point 144. After expiration of the dwell period 146, or after the duration Δt, the controller 130 may be configured to engage the remaining one of the two switches 132 of the phase leg 142 also from a first state to a second state in step 148-5. In one possible implementation, as shown for example in FIG. 4, the controller 130 in step 148-4 may engage the upper switch 132-1 as the first switch of phase A of the motor 110 from an ON state to an OFF state approximately at the high voltage transition point 144, while the lower switch 132-2, engaged as the second switch of phase A, may be held in the ON state for the duration of a dwell period 146. After a duration of Δt, the controller 130 in step 148-5 may then engage the second or lower switch 132-2 of phase A also from the ON state to the OFF state such that the winding insulation 140 is exposed to essentially two smaller increments of voltage swings of magnitude $V_{DC}$ over the dwell period 146, rather than one substantially instantaneous voltage swing of approximately $2V_{DC}$ in magnitude. The dwell period 146 may be a fixed value that is preprogrammed within a memory that is accessible to the controller 130, or alternatively, a value which varies based on one or more operating conditions or parameters of the machine 100 according to one or more preprogrammed relationships.

In an alternative implementation, as shown in FIG. 5 for example, the controller 130 in step 148-4 may engage the lower switch 132-2 as the first switch of phase A from an ON state to an OFF state approximately at the high voltage transition point 144, while the upper switch 132-1, engaged as the second switch of phase A, may be held in the ON state for the duration of a dwell period 146. After a duration of Δt, the controller 130 may then engage the second or upper switch 132-1 of phase A also from the ON state to the OFF state such that the winding insulation 140 is exposed to essentially two smaller increments of voltage swings of magnitude $V_{DC}$ over the dwell period 146, rather than one substantially instantaneous voltage swing of approximately $2V_{DC}$ in magnitude.

In a further alternative implementation, or when the controller 130 in step 148-2 is configured to identify a high voltage transition point 144 corresponding to an increase in the current demand as shown for example in FIG. 6, the controller 130 in step 148-4 may engage the lower switch 132-2 as the first switch of phase A from an OFF state to an ON state approximately at the high voltage transition point 144 at the beginning of a switching period, while the upper switch 132-1, engaged as the second switch of phase A, may be held in the OFF state for the duration of a dwell period 146. After a duration of Δt, the controller 130 in step 148-5 may then engage the second or upper switch 132-1 of phase A also from the OFF state to the ON state such that the winding insulation 140 is exposed to essentially two smaller increments of voltage swings of magnitude $V_{DC}$ over the dwell period 146, rather than one substantially instantaneous voltage swing of approximately $2V_{DC}$ in magnitude.

In yet another alternative, as shown for example in FIG. 7, the controller 130 in step 148-4 may engage the upper switch 132-1 as the first switch of phase A from an OFF state to an ON state approximately at the high voltage transition point 144 at the beginning of a switching period, while the lower switch 132-2, engaged as the second switch of phase A, may be held in the OFF state for the duration of a dwell period 146. After a duration of Δt, the controller 130 in step 148-5 may then engage the second or lower switch 132-2 of phase A also from the OFF state to the ON state such that the winding insulation 140 is exposed to essentially two smaller increments of voltage swings of magnitude $V_{DC}$ over the dwell period 146, rather than one substantially instantaneous voltage swing of approximately $2V_{DC}$ in magnitude.

It will be understood that other modes or configurations of the enforced zero voltage loop methods and systems are possible and will be apparent to those skilled in the art without departing from the scope of the appended claims. For instance, the enforced zero voltage loop may also be implemented at different transition points of the switching period or fundamental cycle, or between different switch states, such as engaging both switches from an OFF switch state to an ON switch state with a dwell period therebetween. In other modifications, the dwell period may also be implemented to entirely precede the high voltage transition point, for example, such that a first switch transitions prior to the high voltage transition point and a second switch transitions at the high voltage transition point upon expiration of the dwell period. In other alternatives, the dwell period may be implemented such that the high voltage transition point falls anywhere within the range designated by the dwell period so long as the engagement of the switches of a given phase are separated by the duration Δt. In still further alternatives, the enforced zero voltage loop may be implemented on other electric drive system configurations, such as drive systems employing different switch configurations per phase, drive systems having motors with different phase configurations, and the like.

INDUSTRIAL APPLICABILITY

In general, the foregoing disclosure finds utility in various industrial applications, such as the farming, construction and mining industries in providing smoother and more efficient control of electric motors typically used in association with work vehicles and/or machines, such as tractors, backhoe loaders, compactors, feller bunchers, forest machines, industrial loaders, skid steer loaders, wheel loaders, and the like. More specifically, the disclosed control systems and methods may be applied to electric drive systems and machines having switched reluctance motors or other comparable motors commonly used in the art.

The systems and methods disclosed herein provide a strategy for driving electric motors which aids in preserving the health of the motor of an associated electric drive system. Moreover, an enforced zero voltage loop is implemented for operating switched reluctance motors during high voltage transitions, such as when current demand abruptly decreases at the end of a switching period or increases at the beginning of a switching period. In particular, by applying a dwell period between the engagements of the switches per phase leg of the motor at such high voltage transition points, the present disclosure serves to prevent or at least reduce the exposure of the winding insulation to instantaneous and substantially high voltage swings thereacross or high levels of current therethrough.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of controlling a motor to enforce a zero voltage loop using a controller and a converter circuit, the method comprising the steps of:
determining one of a switching period, a fundamental cycle, and a current target threshold per phase leg of the motor having at least one high voltage transition point;
determining applicability of the zero voltage loop;
determining a dwell period to be enforced at the transition point between an engagement of a first switch of the phase leg of the converter circuit and an engagement of a second switch of the phase leg of the converter circuit, each of the first switch and the second switch being selectively engageable between a first state and a second state;
engaging the first switch from the first state to the second state at the transition point; and
engaging the second switch from the first state to the second state after the transition point and upon expiration of the dwell period when the zero voltage loop is applicable.

2. The method of claim 1, wherein each of the first switch and the second switch is driven according to a pulse width modulated (PWM) signal, the PWM signal being modified to incorporate the dwell period for one of the first switch and the second switch per phase leg.

3. The method of claim 1, wherein the high voltage transition point corresponds to an end of the switching period where a bus voltage of an associated common bus is to be transitioned from a positive bus voltage to a negative bus voltage.

4. The method of claim 1, wherein the high voltage transition point corresponds to a beginning of the switching period where a bus voltage of an associated common bus is to be transitioned from a negative bus voltage to a positive bus voltage.

5. The method of claim 1, wherein the high voltage transition point corresponds to when both of the first switch and the second switch are to be engaged from the first state to the second state, the first state corresponding to an ON switch state and the second state corresponds to an OFF switch state.

6. The method of claim 1, wherein the dwell period is predefined to be between approximately 2 μs and approximately 4 μs.

7. A control system for a motor, comprising:
a converter circuit operatively coupled to a stator of the motor, the converter circuit including at least a first switch and a second switch coupled to each phase leg of the stator, each of the first switch and the second switch being selectively engageable between a first state and a second state; and
a controller in communication with at least the motor and each of the first switch and the second switch of each phase leg of the converter circuit, the controller being configured to determine applicability of a zero voltage loop, determine a dwell period to be enforced at a high voltage transition point between an engagement of the first switch and an engagement of the second switch, engage the first switch from the first state to the second state at the transition point, and engage the second switch from the first state to the second state after the transition point and upon expiration of the dwell period when the zero voltage loop is applicable.

8. The control system of claim 7, wherein the controller is configured to drive each of the first switch and the second switch according to a pulse width modulated (PWM) signal, the controller modifying the PWM signal to incorporate the dwell period for at least one of the first switch and the second switch per phase leg.

9. The control system of claim 7, wherein the converter circuit is further coupled to a common bus, the controller being configured to correlate the high voltage transition point to an end of a switching period where a bus voltage of the common bus is to be transitioned from a positive bus voltage to a negative bus voltage, and engage the first switch and the second switch per phase leg such that the bus voltage is approximately zero volts during the dwell period.

10. The control system of claim 7, wherein the converter circuit is further coupled to a common bus, the controller being configured to correlate the high voltage transition point to a beginning of a switching period where a bus voltage of the common bus is to be transitioned from a negative bus voltage to a positive bus voltage, and engage the first switch and the second switch per phase leg such that the bus voltage is approximately zero volts during the dwell period.

11. The control system of claim 7, wherein the controller is configured to correlate the high voltage transition point to when both of the first switch and the second switch are to be engaged from the first state to the second state, the controller being configured to define the first state as an ON switch state and the second state as an OFF switch state.

12. The control system of claim 7, wherein the controller is preconfigured to define the dwell period as being between approximately 2 µs and approximately 4 µs.

13. The control system of claim 7, wherein each of the converter circuit and the controller is configured to control a three-phase switched reluctance machine operable in at least one of a generating mode of operation and a motoring mode of operation.

14. An electric drive system, comprising:
  an electric motor having a rotor and a stator, each of the rotor and the stator having a plurality of phase legs;
  a converter circuit in communication with the motor, the converter circuit including at least a first switch and a second switch coupled to each phase leg of the converter circuit, each of the first switch and the second switch being selectively engageable between a first state and a second state; and
  a controller in communication with at least the motor and each of the first switch and the second switch of the converter circuit, the controller being configured to determine applicability of a zero voltage loop, determine a dwell period to be enforced at a high voltage transition point between an engagement of the first switch and an engagement of the second switch, engage the first switch from the first state to the second state at the transition point, and engage the second switch from the first state to the second state after the transition point and upon expiration of the dwell period when the zero voltage loop is applicable.

15. The electric drive system of claim 14, wherein the controller is configured to drive each of the first switch and the second switch according to a pulse width modulated (PWM) signal, the controller modifying the PWM signal to incorporate the dwell period for one of the first switch and the second switch per phase leg.

16. The electric drive system of claim 14, further comprising a common bus that is coupled to the converter circuit, the controller being configured to correlate the high voltage transition point to an end of a switching period where a bus voltage of the common bus is to be transitioned from a positive bus voltage to a negative bus voltage, and engage the first switch and the second switch per phase leg such that the bus voltage is approximately zero volts during the dwell period.

17. The electric drive system of claim 14, further comprising a common bus that is coupled to the converter circuit, the controller being configured to correlate the high voltage transition point to a beginning of a switching period where a bus voltage of the common bus is to be transitioned from a negative bus voltage to a positive bus voltage, and engage the first switch and the second switch per phase leg such that the bus voltage is approximately zero volts during the dwell period.

18. The electric drive system of claim 14, wherein the controller is configured to correlate the high voltage transition point to when both of the first switch and the second switch are to be engaged from the first state to the second state, the controller being configured to define the first state as an ON switch state and the second state as an OFF switch state.

19. The electric drive system of claim 14, wherein the controller is preconfigured to define the dwell period as being between approximately 2 µs and approximately 4 µs.

20. The electric drive system of claim 14, wherein the motor includes a three-phase switched reluctance machine operable in at least one of a generating mode of operation and a motoring mode of operation.

\* \* \* \* \*